No. 857,977. PATENTED JUNE 25, 1907.
T. D. & C. W. P. BROCK.
CEMENT BLOCK MACHINE.
APPLICATION FILED MAY 14, 1906.

5 SHEETS—SHEET 1.

Witnesses
I. S. Edmunds
A. Byrck

Inventors
Thomas D. Brock
Clarence W. P. Brock
By P. J. Edmunds
Attorney

No. 857,977. PATENTED JUNE 25, 1907.
T. D. & C. W. P. BROCK.
CEMENT BLOCK MACHINE.
APPLICATION FILED MAY 14, 1906.

5 SHEETS—SHEET 5.

Witnesses
J. S. Edmunds
A. Byrick

Inventors
Thomas D. Brock
Clarence W. P. Brock
By P. J. Edmunds Attorney

UNITED STATES PATENT OFFICE.

THOMAS D. BROCK AND CLARENCE W. P. BROCK, OF WATERFORD, ONTARIO, CANADA.

CEMENT-BLOCK MACHINE.

No. 857,977.      Specification of Letters Patent.      Patented June 25, 1907.

Application filed May 14, 1906. Serial No. 316,877.

*To all whom it may concern:*

Be it known that we, THOMAS D. BROCK and CLARENCE W. P. BROCK, both subjects of the King of Great Britain, and both residents of Waterford, in the county of Norfolk, in the Province of Ontario, Canada, have jointly invented a new and useful Improved Cement-Block Machine, of which the following is a specification.

This invention relates to a machine for molding building blocks from cement or other plastic material.

The object being to provide a simple, strong and durable machine, by the use of which perfect building blocks of cement may be rapidly and consequently cheaply manufactured, and a further object is to readily adjust the machine to adapt it to make building blocks of different width and thickness. And this invention consists of the improved construction and novel combination of parts of the same as will be hereinafter first fully set forth and described and then pointed out in the claims.

Reference being had to the accompanying drawings forming part of this specification wherein;—

Figure 1:
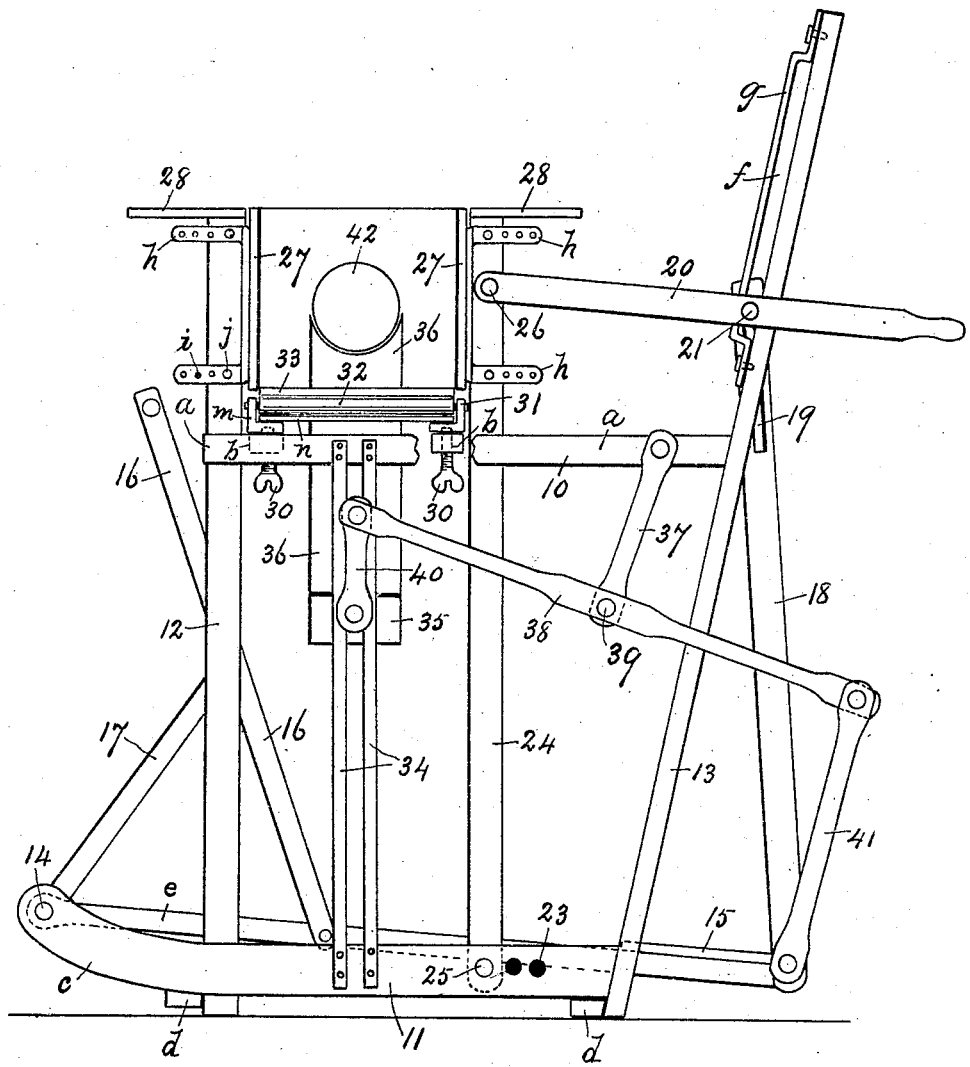
Figure 2:
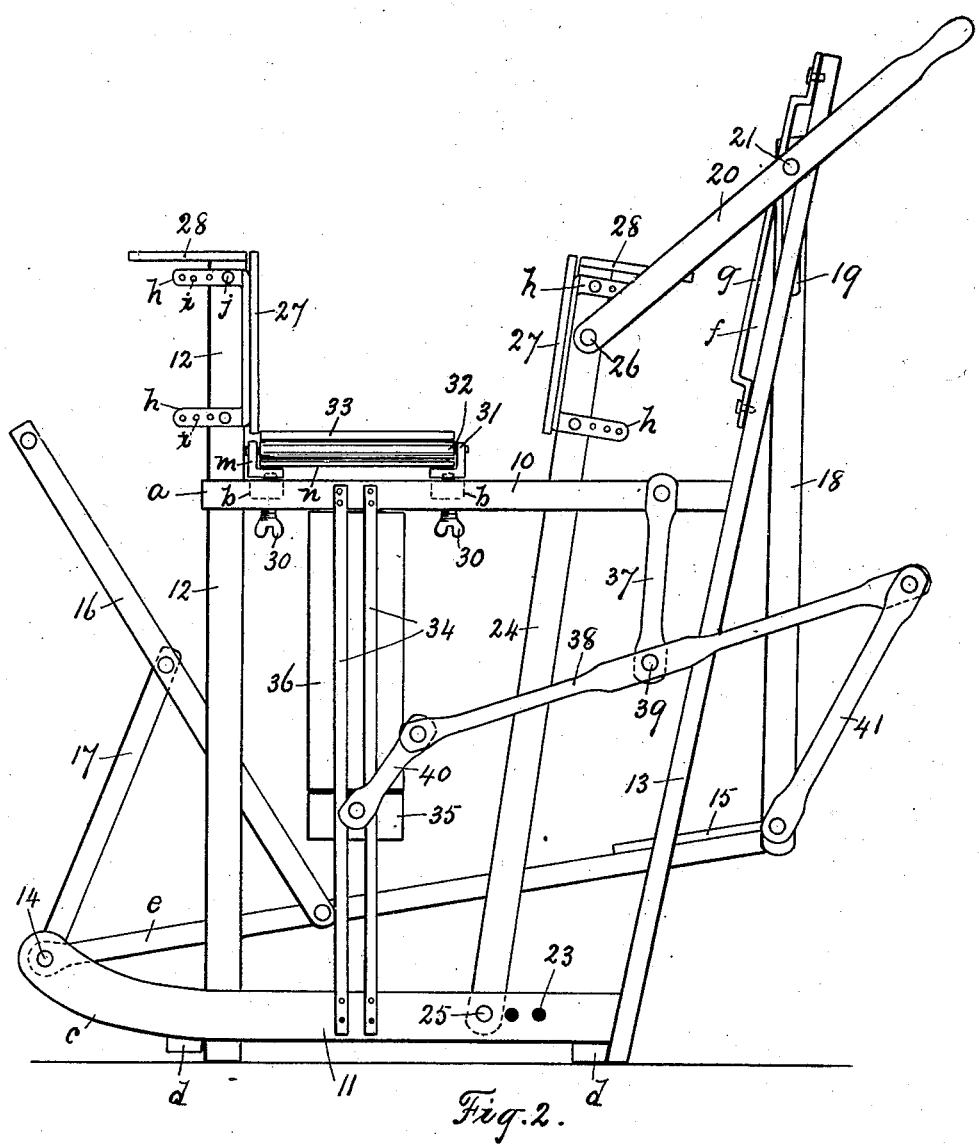
Figure 3:
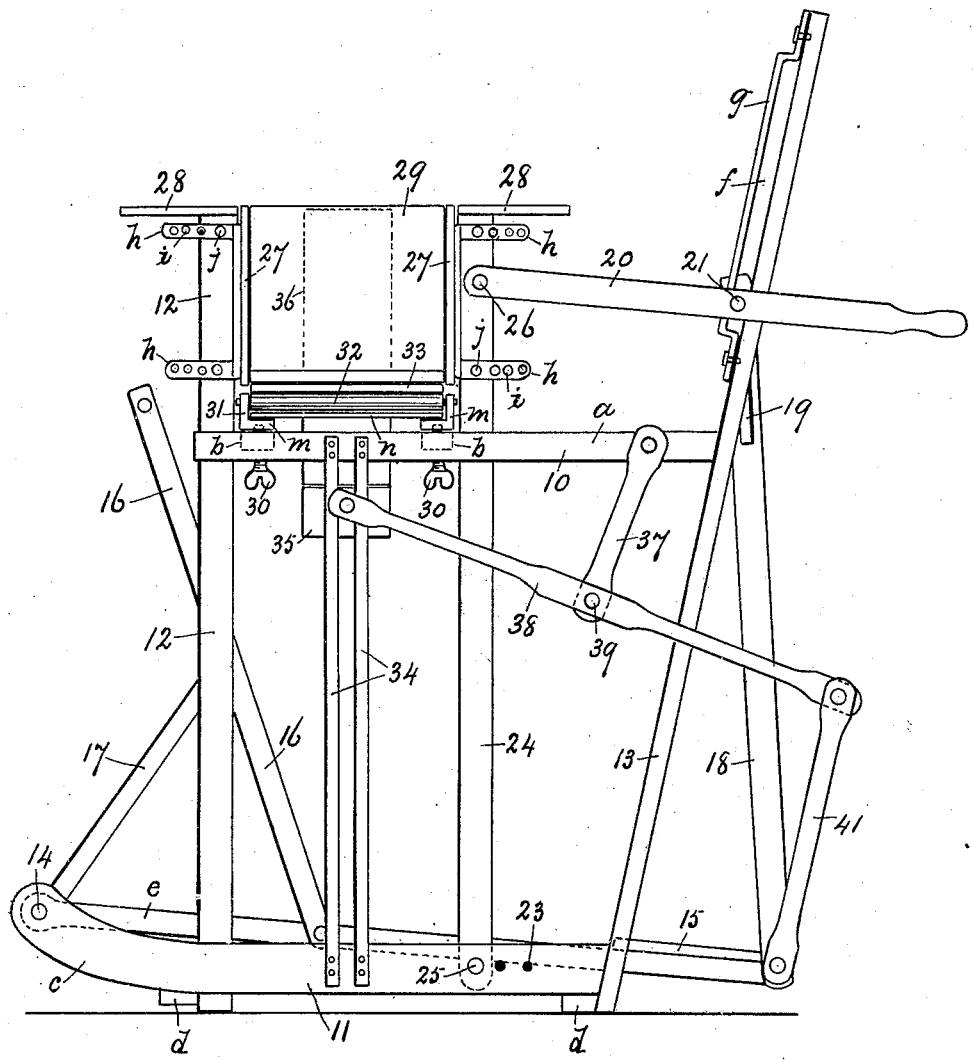
Figure 4:
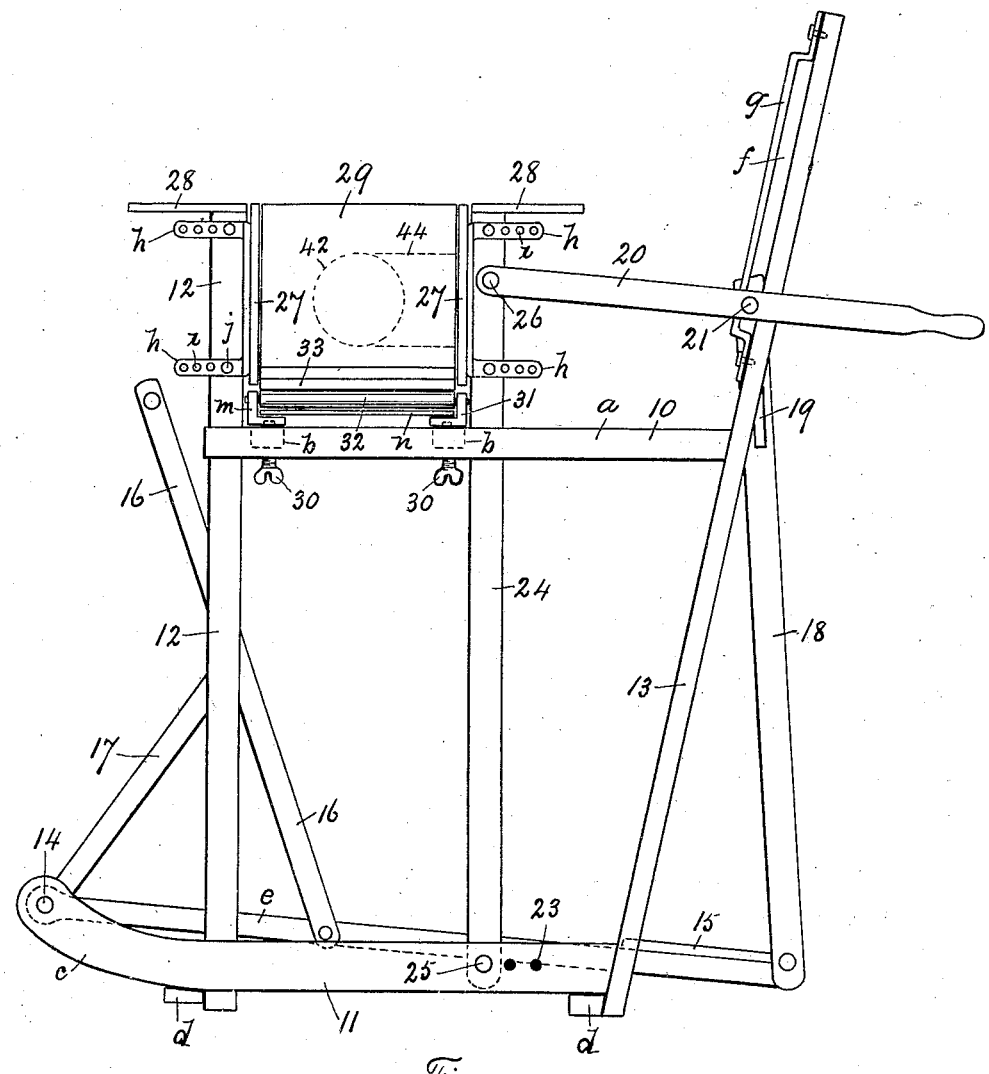
Figure 5:
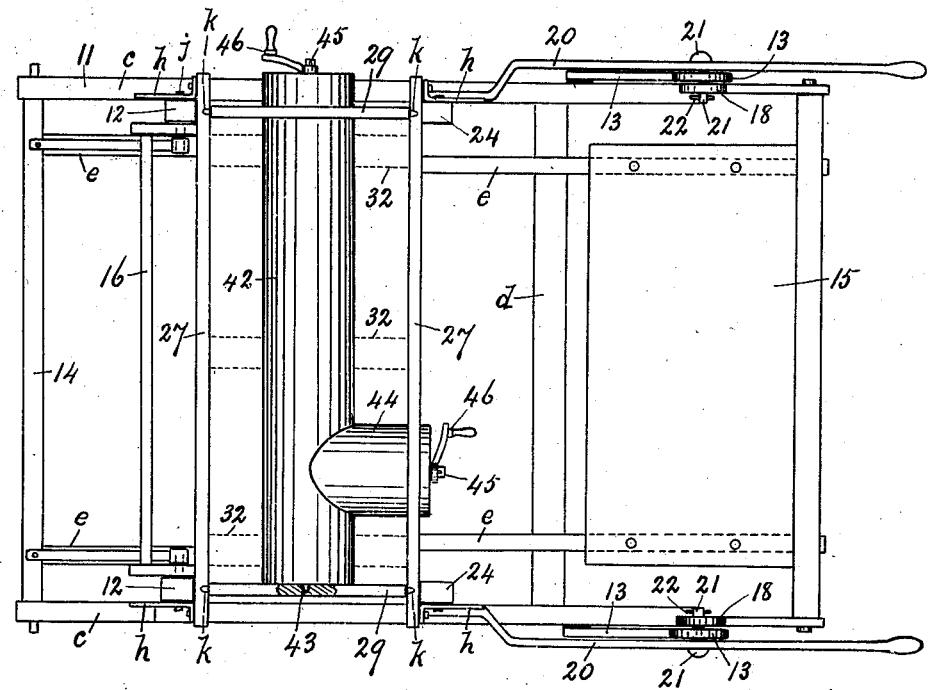
Figure 6:
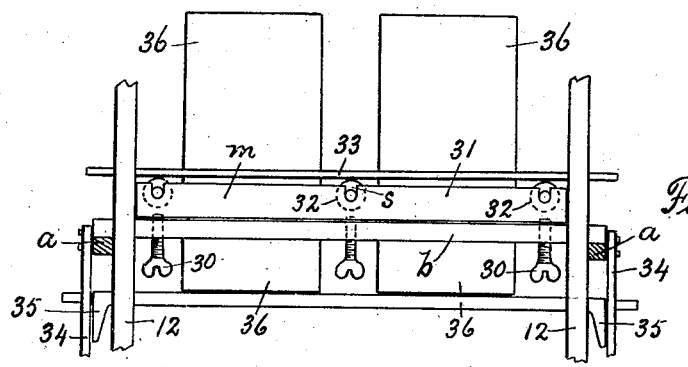
Figure 7:
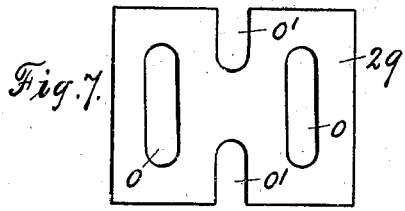
Figure 8:
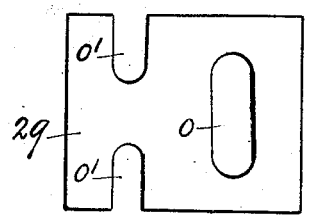

Figure 1 is a side view of a machine embodying our invention, showing the mold box closed to mold a building block, in this view the end of the mold box toward the observer is removed. Fig. 2 is another view of the same showing the mold box open, and both ends removed. Fig. 3 illustrates a slight modification in the construction of the machine. Fig. 4 is another modification illustrating a stationary core, in this view the core head and core operating mechanism are removed. Fig. 5 is a plan view of the machine shown in Fig. 4, in this view the shelves are removed. Fig. 6 is a detail end view of the upper portion of the machine illustrating the adjustment of the pallet. Figs. 7 and 8 are slightly enlarged detail views of modifications in the construction of the ends of the mold box.

In the accompanying drawings;—the numeral 10 designates the bed of the machine supported at a suitable height above the floor or ground, to make it convenient for the operator to fill, tamp and strike off the mold, and this bed is composed of the opposite side bars, *a*, which are rigidly braced and connected together by the cross bars, *b*.

11 designates the base composed of the opposite side sills, *c*, which are rigidly and firmly connected together by the cross sills, *d;* and 12 and 13 designate uprights which rigidly and firmly secure the base 11 and bed 10 together at opposite sides of the machine, and in the upper ends of each of the uprights 13 which extend above the bed 10 an elongated slot, *f*, is formed either in said bar or by securing a shouldered strap, *g*, to one side of said upright 13.

14 designates a shaft adapted to rock freely in bearings in the opposite sides, *c*, of the base 11.

15 designates a platform the sides, *e*, of which are secured at one end to the rock shaft 14.

16 designates a handle frame secured at one end to the sides, *e*, of the platform 15, and 17 are braces which connect said handle frame 16 with the rock shaft 14, to rigidly and firmly hold and secure said handle frame to the sides, *e*, of the platform 15.

18 designate connection bars pivotally secured at their lower ends to the opposite sides of the platform 15, and in the upper ends of these bars 18 elongated slots 19 are formed.

20 designate hand levers located at opposite sides of the machine, and in each of these levers 20 a pivot bolt 21 is secured; and said pivot bolts 21 are longer than said hand levers 20 in cross section, and their shanks extend through and are adapted to move freely lengthwise in the slots, *f*, and 19 of the upright 13 and connecting bar 18, respectively, at the sides of the machine adjacent to said levers 20; and the enlarged head at one end and a pin 22 in the other end of said pivot bolts prevent them from falling out of said levers 20 or said elongated slots, *f*, and 19 of said upright 13 and connecting bar 18 respectively.

23 designate a series of bolt holes formed opposite one another in each of the side sills, *c*, of the base 11, and 24 designates a swinging frame the lower ends of the sides of which are mounted on bolts 25 held in place opposite one another in one of said series of bolt holes 23; and to the upper end and at the opposite sides of this swinging frame 24, one end of the hand levers 20 are pivotally secured by the pivot bolts 26.

27 designates the sides of the mold box one of which is secured to the portion of the uprights 12 which project above the bed 10, and the other side 27 to the portion of the swinging frame 24 which projects above said bed 10; and secured to each of these sides 27 are straps, *h*, in which a series of bolt holes, *i*, are formed, and, *j*, are bolts which extend through one of the bolt holes, *i*, in each of said straps, *h*, and into the frame 24 and uprights 12, this forms a convenient means of securing the sides 27 of the mold box to said frame 24 and uprights 12; and by removing said bolts, *j*, and moving the sides 27 closer together and inserting the bolts, *j*, in the bolt holes, *i*, opposite, said uprights 12 and frame 24, the sides may be firmly held in this closer position to form a narrower building block.

28 designates tables or shelves one of which is secured to the upper ends of the uprights 12 and the other to the upper end of the swinging frame 24 adjacent to the sides 27 of the mold box, these shelves 28 are for the purpose of preventing the material from falling down, if it should run over the sides 27 of the mold box when filling or tamping said mold box.

29 designate the ends of the mold box provided with registering pins, *k*, which are fitted to and inserted in corresponding sockets in the sides 27, to firmly hold said ends in place when filling and tamping the mold.

30 designate thumb screws which extend through screw threaded sockets in the cross bars, *b*, at opposite sides of the mold box, and the upper ends of said thumb screws 30 are inserted in sockets in the adjustable frame 31.

31 designates an adjustable frame composed of the angular sides, *m*, connected together by the braces, *n*, and supported on the thumb screws 30, and 32 are rollers mounted in recesses or sockets, *s*, extending into said angular sides, *m*.

33 designates a pallet resting on said rollers 32.

34 designate guide bars, which are firmly secured at one end to the base 11 and at the upper end to the bed 10, and a pair of these guide bars are secured opposite one another to opposite sides of the machine.

35 designates an adjustable core head, the ends of which are inserted between said guide bars 34; and 36 designate cores secured to said adjustable core head 35.

37 designate hangers pivotally secured to the bed 10 at opposite sides of the machine, and 38 designate levers one of which is fulcrumed on the pivot bolt 39 supported in each of said hangers 37 at opposite sides of the machine.

40 designates a link connection between one end of each of said levers and the core head 35, and 41 represents a link connection between the other end of each of said levers 38 and the platform 15.

42 designates another core extending lengthwise of the mold box, and provided with a pin 43, which is projected into a socket in one of the ends 29 of the mold box, to support this end of said core, and at the other end said core is supported in and projects through a corresponding opening formed in the opposite end 29 of said mold box.

44 designates a branch core supported at its inner end on the core 42, and its other end is supported in and projects through a corresponding opening in the side 27 of the mold box.

45 designates a pin formed with an angular projecting end which is secured in the end of each of said cores 42 and 44 where they project beyond the mold box, and 46 is a crank handle adapted to engage with said angular projecting end of said pin 45, to provide a convenient means for rotating and loosening said cores from the cement in the mold box before withdrawing said cores 42 and 44.

In Figs. 4 and 5, a longitudinal core 42 and a lateral branch core 44 is shown, which core 42 is supported at one end by a pin 43 fixed therein inserted in a socket in the adjacent end 29 of the mold box, and the other end of this core is projected through and is supported in an opening in the other end 29 of the mold box; but four or three longitudinal cores may be used and their ends supported in openings, *o*, in the ends 29 of the moldbox, as shown in Figs. 7 and 8; in Fig. 7 four openings are shown to support the ends of four longitudinal cores, and in Fig. 8 three openings are shown to support the ends of three longitudinal cores to form three separate and independent longitudinal passages through the building block, but one or any number or plurality of cores may be used in this machine, and a corresponding number or plurality of passages formed in the building block, and said cores may be staggered or so arranged as shown in Figs. 7 and 8 that the cavities which they form in the building block of one row will come opposite to the interval between the adjacent cavities of the succeeding row; and they may also be provided with cores forming half cavities, $o^1$, so that when two blocks are placed in proper position in the wall, the two half cavities will come opposite one another and form one single cavity extending partly into the two adjacent blocks.

In the modification of this machine shown in Figs. 1 and 3 vertical cores are shown, to make building blocks with a vertical passage partly or wholly through the building block, so that the construction of this machine permits it to be used for the manufacture of building block either with vertical or longitudinal cores.

The operation is as follows:—When the machine is adjusted as shown in Fig. 2, by placing ends 29 in proper position on the pallet 33 and engaging the pins, *k*, with corresponding recesses in the sides 27, then grasping the hand levers 20 and adjusting them to the position shown in Fig. 1, the bolt 21 moves down the inclined slot, f, and the swinging frame 24 being secured to these hand levers 20 the side 27 secured to said frame 24 is adjusted against the ends 29, this binds the ends firmly between said sides 27 and on the pallet 33, the operator then stands on the platform 15, to securely hold the sides and ends of the mold box as adjusted while said mold box is being filled and tamped. And if it is intended to make building block with a vertical passage part way through the block, the levers 38, coupling links 40 and 41, core head 35, guide bars 34 and cores 36 are used. But if a vertical passage entirely through the block is required, the link 40 is dispensed with; and if longitudinal cores are used the levers 38, hangers 37, links 40 and 41, guide bars 34, core head 35 and cores 36 are removed, and the horizontal cores projected lengthwise through the mold box from one end 29. After the block is molded the hand levers 20 and attachments are adjusted to the position shown in Fig. 2, this swings the frame 24 away from the newly molded cement block, when the ends may be readily and easily removed, the block removed on the pallet 33, another pallet placed on the rollers 32 and the operation repeated until the required number of block are made. The sides 27 are removable so that one side may be removed and another secured in its place having a different pattern formed thereon, so that this machine may be adapted to form building blocks either plain, or in imitation of cut stone, or beveled, or with any sunk or raised figure or ornament required. By forming the sides 27 and ends 29 narrower in depth, and adjusting the frame 31 with the pallet 33 thereon upward until the latter abuts against said sides and ends, a block of less depth is formed, and by adjusting the sides 27 closer together as before described and supplying ends 29 of less length, a block of narrower width may be formed. Or again by adjusting the swinging frame 24 in the series of holes 23 toward the uprights 13, and providing longer ends 29 and a wider pallet 33, a very much wider building block may be formed.

Having thus described our invention, we claim:—

1. In a device of the class described, a stationary supporting frame, a member constituting one side of a mold box and carried by said stationary frame, a swinging frame carried by said supporting frame, a member constituting the other side of said mold box and carried by said swinging frame, a pallet constituting the bottom of said mold box and supported upon said stationary frame, transverse members spaced apart and constituting the ends of said mold box, one of said ends having transverse apertures and the other of said ends having sockets corresponding to said apertures, and cores adapted to be disposed within said mold box and each with a pin at one end respectively engaging said sockets and with the other ends extending through said apertures, and means for operating said swinging frame.

2. In a device of the class described a stationary supporting frame, a member constituting one side of a mold box and carried by said stationary frame, a swinging frame carried by said stationary frame, a member constituting the other side of said mold box and carried by said swinging frame, a pallet constituting the bottom of said mold box and supported upon said stationary frame, transverse members spaced apart and constituting the ends of said mold box, one of said ends having a central aperture and the other of said ends having an internal socket, a core adapted to be disposed within said mold box with a pin at one end engaging said socket, and with the other end extending through said end aperture and means for operating said swinging frame.

3. In a device of the class described a stationary supporting frame, a member constituting one side of a mold box and carried by said stationary frame, a swinging frame carried by said stationary frame, a member constituting the other side of said mold box and carried by said swinging frame, a pallet constituting the bottom of said mold box and supported upon said stationary frame and provided with an intermediate aperture, transverse members spaced apart and constituting the ends of said mold box, one of said ends having a transverse aperture a core adapted to be disposed longitudinally within said mold box with one end extending through the apertures in one of said end members and the other end detachably supported upon the other end member, a branch core adapted to be disposed through the aperture in said pallet and with one end formed to engage the longitudinal core, and means for simultaneously operating said branch core and said swinging frame and the mold box side member carried thereby.

4. In a device of the class described a stationary frame, a member constituting one side of a mold box and carried by said stationary frame, a swinging frame carried by said stationary frame, a member constituting the opposite side of the mold box and carried by said swinging frame and provided with a transverse aperture, a pallet constituting the bottom of said mold box and carried by said swinging frame, spaced members constituting the ends of said mold box, one of said end members having a transverse aperture, a core disposed longitudinally within said mold box with one end extending through the aperture in one of said end members and the other end detachably supported from the other end member, a branch core extending through the aperture in said movable side member and with the inner end formed to bear upon the longitudinal core, and means for operating said swinging frame and the mold box side member carried thereby.

5. In a device of the class described, a stationary supporting frame having vertical guide ways and inclined guide ways, a member constituting one side of a mold box and carried by said stationary frame, a pallet carried by said frame and constituting the bottom of said mold box and provided with an intermediate aperture, a swinging frame carried by said stationary frame, a member constituting the opposite side of said mold box and carried by the swinging frame, spaced members constituting the ends of said mold box, an arm swinging at one end from said stationary frame, a bar swinging at one end from the free end of said swinging arm and with the other end slotted and engaging a pin extending through the inclined guide ways of said stationary frame, an operating lever pivoted at one end to said swinging frame and engaging the pin operating in said slotted and inclined guide ways, a longitudinal core adapted to be disposed within said mold box, a branch core operative through the aperture in said pallet and with one end adapted to engage said longitudinal core, and provided with guide devices engaging the vertical guide ways of said stationary frame, links swinging respectively from the free end of said core guide devices and the free end of said swinging arm, a rod movably connected to the free ends of said links, and a fulcrum link connected at one end to said rod intermediate its ends and at the other end to said stationary frame, whereby when said operating arm is actuated the swinging frame together with the mold box side member carried thereby and the movable core member will be simultaneously operated.

In testimony whereof, we have signed in the presence of the two undersigned witnesses.

THOMAS D. BROCK.
CLARENCE W. P. BROCK.

Witnesses:
P. J. EDMUNDS,
A. BYRICK.